United States Patent
Mason

(10) Patent No.: US 7,140,694 B2
(45) Date of Patent: Nov. 28, 2006

(54) WHEEL SPOKE ADJUSTER GUARD

(76) Inventor: Steven Mason, 2702 Wilmington Dr., Ontario, CA (US) 91761

( * ) Notice: Subject to any disclaimer, the term of this patent is extended or adjusted under 35 U.S.C. 154(b) by 0 days.

(21) Appl. No.: 11/092,214

(22) Filed: Mar. 29, 2005

(65) Prior Publication Data

US 2006/0220441 A1    Oct. 5, 2006

(51) Int. Cl.
*B60B 7/00* (2006.01)
(52) U.S. Cl. .................. 301/37.41; 301/104
(58) Field of Classification Search ............... 301/5.21, 301/37.41, 37.372, 37.374, 37.376, 58, 95.101, 301/104
See application file for complete search history.

(56) References Cited

U.S. PATENT DOCUMENTS

| | | | | |
|---|---|---|---|---|
| 516,482 | A * | 3/1894 | Pocht, Jr. ............ | 301/6.5 |
| 672,747 | A * | 4/1901 | Wheeler ............. | 301/58 |
| 1,734,184 | A * | 11/1929 | Stoler ............... | 411/427 |
| 2,269,670 | A | 1/1942 | Kieckbusch | |
| 2,558,423 | A | 6/1951 | Dobrosky | |
| 3,561,820 | A * | 2/1971 | Chaivre ............ | 301/37.374 |
| 3,960,047 | A * | 6/1976 | Liffick ............. | 411/429 |
| 4,695,099 | A | 9/1987 | Klein | |
| 4,906,050 | A | 3/1990 | Soder et al. | |
| 5,801,883 | A | 9/1998 | Peters | |
| 6,205,664 | B1 * | 3/2001 | Cappellotto ........ | 29/894.33 |
| 6,273,658 | B1 * | 8/2001 | Patterson et al. ..... | 411/431 |
| 6,588,852 | B1 | 7/2003 | Mason | |

FOREIGN PATENT DOCUMENTS

JP            61-81801    *    4/1986

* cited by examiner

*Primary Examiner*—Russell D. Stormer
(74) *Attorney, Agent, or Firm*—Lewis Brande; Thomas A. McCleary; Brande and McCleary

(57) ABSTRACT

A Wheel Spoke Adjuster Guard that comprises a visually pleasing outer shape with an internal cavity, where the internal cavity has a lower portion shaped complimentary to the wheel adjuster nuts on the wheel spokes of either motorcycles, bicycles, or other motor conveyances using spoked wheels and an internally threaded portion adapted to threadably engage the spokes of the wheel. The upper portion of the internal cavity has a shape complimentary to the existing diameters of the spokes of the wheel assemblies. The adjuster guard is threaded onto the spoke and the internal cavity encases the spoke adjuster. The adjuster guard may have some Lock-Tite© or sealant to prevent any loosening of the adjuster guard.

2 Claims, 3 Drawing Sheets

WHEEL SPOKE ADJUSTER GUARD

BACKGROUND OF THE INVENTION

1. Field of the Invention

This invention is an improvement of U.S. Pat. No. 6,588,852 by Steven Mason dated Jul. 8, 2003. This invention relates to a device that can protect the adjustment and wheel rim areas of spoked wheels from the intrusion of foreign objects such as dirt. By adding this device to spoked wheels, they will enhance the functionality of the spoke adjusting areas of the wheel rims by increasing the life span of the spoked wheels and also provide a decorative addition to the spoked wheel.

2. Description of the Prior Art

The use of devices to protect the adjustment areas of wheel spokes is known in the prior art.

U.S. Pat. No. 6,588,852 by Steven Mason (the inventor of the current invention) reveals a wheel spoke adjuster guard that comprises a pleasing outer appearance with an internal cavity complementary to the wheel adjuster nuts on the wheel spokes of a wheel. The adjuster guard has means to lock the guard onto a wheel spoke, preventing unwanted motion.

U.S. Pat. No. 4,906,050 by Soder et al., discloses "Beads for Bicycle Wheel Spokes." The principle purpose of this invention is to provide visual and audible effects while the wheel is being used. This invention discloses a bead that is free to move along the length of the spoke, which then creates a pleasing visual effect. This invention is specifically related to the creation of a visual effect and an audible noise.

U.S. Pat. No. 4,695,099 by Klein, discloses a "Wheel Spoke Adjuster Guard." This invention is a two-piece device that is snapped together around the adjuster lug portion of the spoked wheel.

U.S. Pat. No. 2,558,423 by Dobrosky, discloses "A Spoke Ornament for Bicycle Wheels." This device uses tubular sections in unison, where when connected together, have interlocking key areas that prevent any one element from being dislodged from the spoke. This invention is ornamental in concept. When attached to a bicycle wheel, the alternating colors create alternating bands of color while the wheel is moving.

U.S. Pat. No. 2,269,670 by Kieckbusch, discloses a "Balance Weight." This invention is used to balance motorcycle wheels inexpensively, easily and simply.

U.S. Pat. No. 5,801,883 by Peters, discloses "High Visibility Reflective Tubing for Bicycle Wheels." This invention is to create a highly reflective area of a bicycle rim in order to enhance the bicyclist's visibility in low light and bad weather conditions.

U.S. Pat. Nos. 4,906,050, 2,558,423, and 5,801,883 contain no teaching or suggestion that they may be used to attach to the lug area of spoked wheels and prevent the intrusion of foreign materials. They specifically teach the art of either enhancing the visibility of the operator, or making a pleasing sound. None of the previously mentioned patents disclose a lug adjuster guard that is threaded onto the spoke and/or the adjuster guard to enhance the aesthetics of the wheel rim, and protect the adjuster guard from dirt and debris.

SUMMARY OF THE INVENTION

It is an object of the invention to create a one piece device that can protect the adjusting lug areas, the threaded end of the spoke, and the wheel rim holes of spoked wheel assemblies from the intrusion of foreign materials such as dirt.

The improvement utilizes a slideable cover or cowl that uses a the threading defined on common wheel spokes, and an internally threaded portion of the cover or cowl that threadably engages the spoke, thereby locking the cover or cowl and protecting the spoke adjusters from intruding materials from the road.

It is another object of the invention to create an aesthetically pleasing appearance to the spokes and the wheel.

Other objects, advantages, and novel features of the present invention will become apparent from the following detailed description of the invention when considered in conjunction with the drawings accompanying the patent.

DETAILED DESCRIPTION

Figure 1:
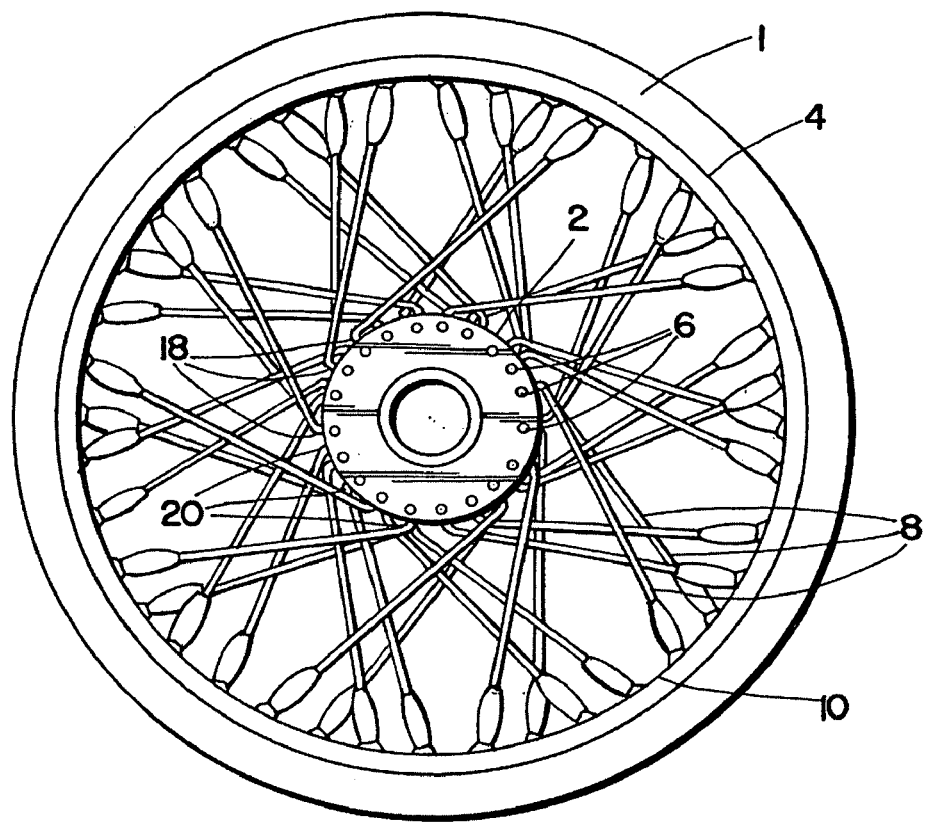
FIG. 1 shows a view of an overall view of a wire rim with the wheel spoke adjuster guard installed
Figure 2:
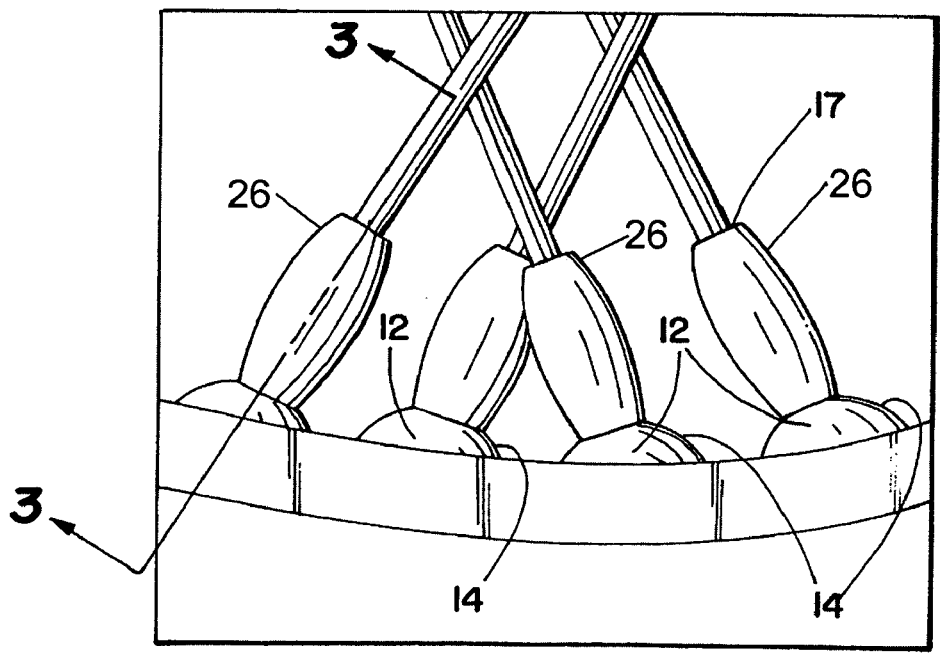
FIG. 2 shows a detail view of the rim, spoke and wheel spoke adjuster guard

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

With respect to figures one, and two a wire wheel assembly (1) is shown. The wire wheel assembly (1) contains a central disk (2) and an outer tire mounting rim (4) or wheel rim. The central disk (2) has a first plurality of holes (6) defined therethrough. Wire spokes (8) are inserted through the first plurality of holes (6) and extend radially from the central disk (2). The wheel rim (4) has a cross sectional shape that is common in the wheel industry. The wheel rim (4) has an inner surface (10), where the inner surface (10) is facing towards the central disk (2) and oriented at a 90 degree angle to the central disk (2). The central disk (2) is circular in shape and defines a plane that is normal to the inner surface (10) of the wheel rim (4). Integrally mounted onto the inner surface (10) of the wheel rim (4) is a first plurality of spherical bearing surfaces (12), where the quantity of the first plurality of spherical bearing surfaces (12) equals quantity of the first plurality of holes (6). The first plurality of spherical bearing surfaces (12) and hence the inner surface (10) of the wheel rim (4) have a second plurality of holes (14) defined therethrough, where the quantity of the second plurality of holes (14) equals the quantity of the first plurality of holes (6) in the central disk (2). A spoke adjuster (16) is inserted through each of the second plurality of holes (14). The spoke adjuster (16) is mushroom shaped, having a button head and a hex shaped tubular section which is common in the wire wheel industry. The spoke adjuster (16) has an internally threaded hole defined therethrough, which is also common within the industry.

The wire spokes (8) have a 90 degree bend at a first end (18) and a formed button shape (20) to allow the wire spokes (8) to fix the central disk (2) at a geometric center of the wheel rim (4). The wire spokes (8) have a second end (22) the second end having an externally threaded portion (24). The externally threaded portion (24) of each wire spoke (8) threadably engages each spoke adjuster (16) tensioning each wire spoke (8) thereby. Each spoke adjuster (16) is adjusted to provide the correct tension on each wire spoke (8) making a balanced wheel assembly (1).

Figure 3:
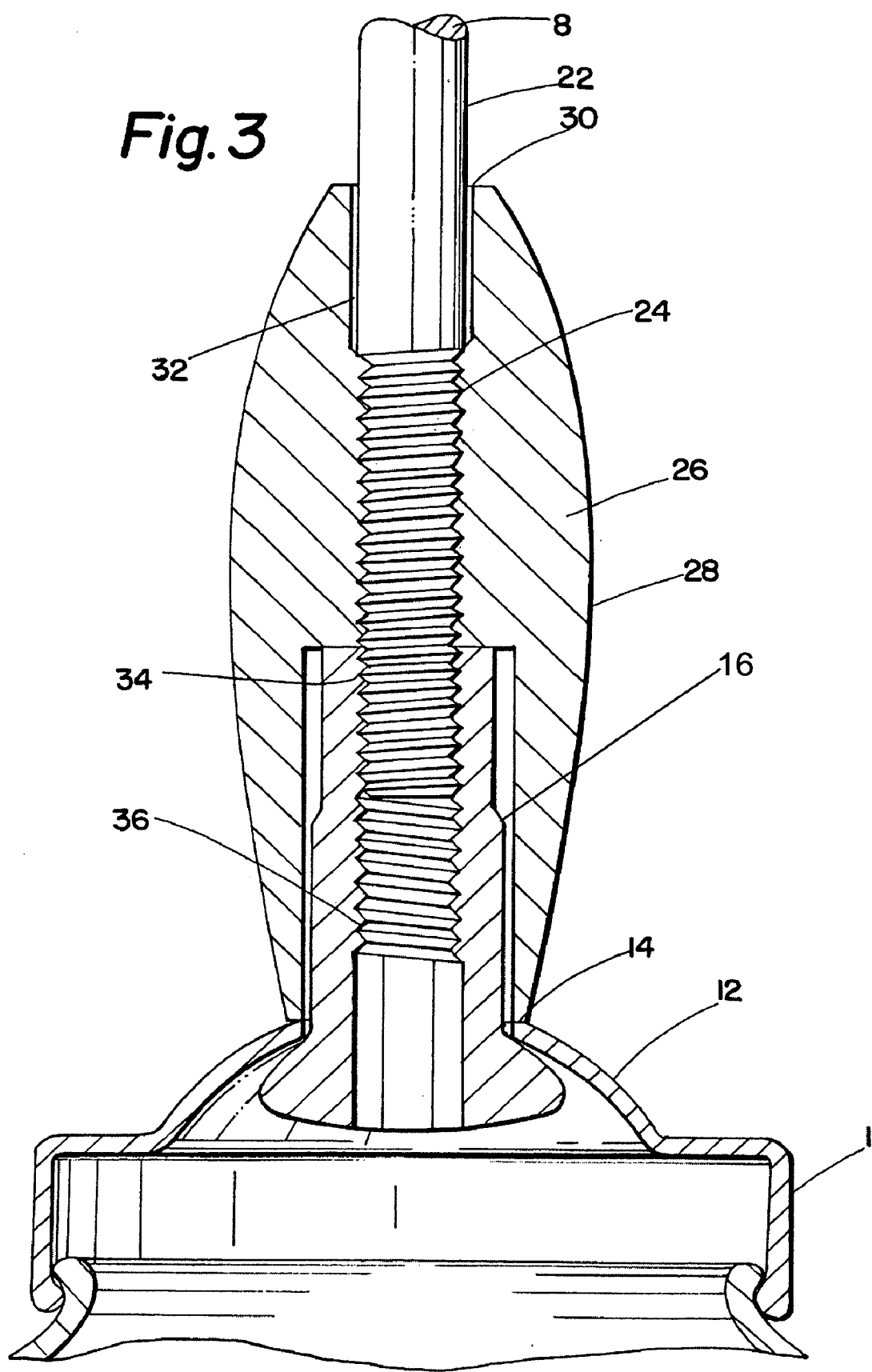
FIG. 3 shows a cross sectional view of the rim, spoke and wheel spoke adjuster guard

An adjuster guard (26) is shown in FIG. 3. The adjuster guard (26) is shown having an exterior surface (28) that is shown as a surface of revolution, but may be of any shape. The adjuster guard (26) is shown with a centrally threaded hole (30) defined therethrough. The centrally threaded hole (30) is linear. The centrally threaded hole (30) has an upper counterbored portion (32) where the upper counterbored portion (32) allows the non-threaded portion of the wire spoke (8) to be easily inserted therethrough. The upper counterbored portion (32) is not threaded. The centrally threaded hole (30) additionally has a lower counterbored portion (34), where the lower counterbored portion (34) is positioned at an opposing end (36) of the upper counterbored portion (32), and also is not threaded. The lower counterbored portion (34) is sized to allow a clearance fit to the spoke adjuster (16).

In practice, the spoke adjuster (16) used is modified to be shorter than what is currently used in order to expose enough threads allowing the adjuster guard (26) to be easily threaded onto the wire spoke (8). The modification of the spoke adjuster (16) maximizes the engagement of the centrally threaded hole (30) of the adjuster guard (26) and the externally threaded portion (24) of the wire spoke (8). The adjuster guard (26) is positioned onto the wire spoke (8). The spoke adjuster (16) is inserted through the second plurality of holes (14) and threadably engages the wire spoke (8). The adjuster guard (26) is slid towards the spoke adjuster (16) and threadably engages the externally threaded portion (24) of the wire spoke (8). The adjuster guard (26) has a lower surface (36), where the lower surface (36) is shaped to intimately contact the spherical bearing surface (12). Loc-Tite©, other thread locking materials, or sealant may be used to prevent unwanted dislocation of the adjuster guard (26) when it is threaded to its final position, as well as providing an environmental seal.

Figure 4:
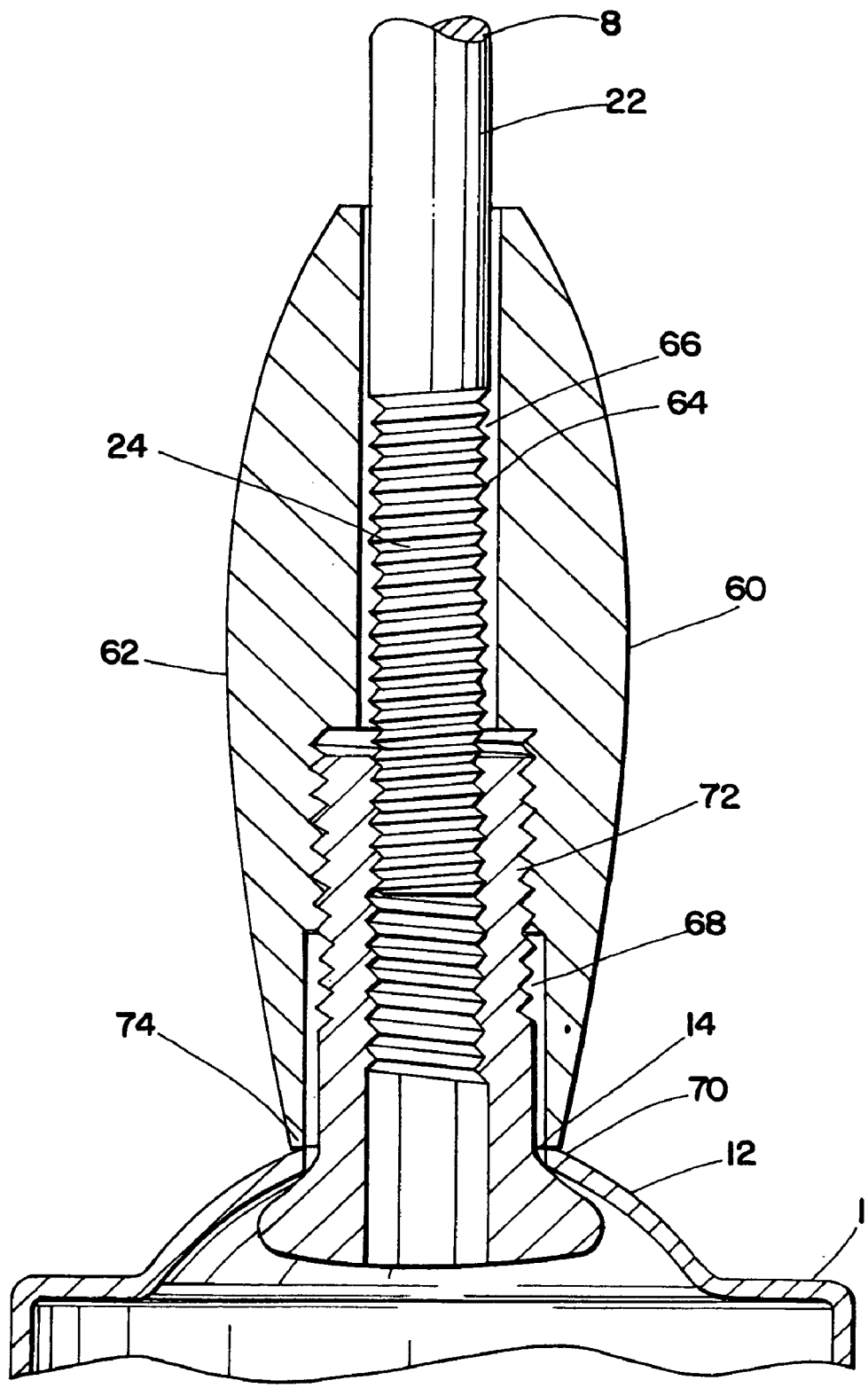
FIG. 4 shows a second embodiment of the rim, spoke and wheel spoke adjuster guard.

A second embodiment of the spoke adjuster guard (60) is shown in FIG. 4. The spoke adjuster guard (60) is shown having an exterior surface (62) that is shown as a surface of revolution, but may be of any shape. The adjuster guard (60) is shown with a centrally threaded hole (64) defined therethrough. The centrally threaded hole (64) is linear. The centrally threaded hole (64) has an upper portion (66) where the upper portion (66) allows the non-threaded portion of the wire spoke (8) to be easily inserted therethrough. The upper portion (66) is not threaded and is smaller in diameter than the centrally threaded hole (64). The centrally threaded hole (64) additionally has a lower counterbored portion (68), where the lower counterbored portion (68) is positioned at an opposing end (70) of the upper portion (66). The centrally threaded hole (64) is sized to threadably engage a modified spoke adjuster (72).

In practice, the modified spoke adjuster (72) is shorter than what is currently used in order to expose enough threads allowing the adjuster guard (60) to be easily threaded onto the modified spoke adjuster (72). The modification of the spoke adjuster (16) maximizes the engagement of the centrally threaded hole (64) of the adjuster guard (60) and the modified spoke adjuster (72). The adjuster guard (60) is positioned onto the wire spoke (8). The modified spoke adjuster (72) is inserted through the second plurality of holes (14) and threadably engages the wire spoke (8). The adjuster guard (60) is slid towards the modified spoke adjuster (72) and threadably engages the modified spoke adjuster (72). The adjuster guard (60) has a lower surface (74), where the lower surface (74) is shaped to intimately contact the spherical bearing surface (12). LocTite©, other thread locking materials, or sealant may be used to prevent unwanted dislocation of the adjuster guard (60) when it is threaded to its final position, as well as providing an environmental seal

What is claimed is:

1. A wheel spoke adjuster guard, comprising:
   a. an exterior surface, said exterior surface having a top and a bottom defined thereon, said top of said exterior surface having a centrally threaded hole defined therethrough, said centrally threaded hole being linear and exiting through said bottom of said exterior surface;
   b. said centrally threaded hole additionally having a lower counterbored portion, said lower counterbored portion penetrating said bottom of said exterior surface, said lower counterbored portion being positioned in proximity of said bottom of said exterior surface, said lower counterbored portion additionally not being threaded, said lower counterbored portion being adapted to allow a clearance fit to a spoke adjuster;
   c. said centrally threaded hole additionally has an upper portion, said upper portion being smaller in diameter than said centrally threaded hole and is non-threaded, being adapted to allow a wire spoke to be slidably inserted therethrough; and
   d. said centrally threaded hole is adapted to threadably engage a modified spoke adjuster.

2. The wheel spoke adjuster guard of claim 1, wherein; said wheel spoke adjuster guard has a lower surface, said lower surface where the is shaped to intimately contact a spherical bearing surface on a wheel rim.

* * * * *